(12) United States Patent
Jatzke et al.

(10) Patent No.: US 9,694,950 B2
(45) Date of Patent: Jul. 4, 2017

(54) SEALING PLUG

(71) Applicant: ITW FASTENER PRODUCTS GmbH, Iserlohn (DE)

(72) Inventors: Stefan Jatzke, Eberstsheim (DE); Juergen Hofmann, Eisenburg (DE)

(73) Assignee: ITW Fastener Products GmbH, Iserlohn (DE)

( * ) Notice: Subject to any disclaimer, the term of this patent is extended or adjusted under 35 U.S.C. 154(b) by 0 days.

(21) Appl. No.: 14/825,248

(22) Filed: Aug. 13, 2015

(65) Prior Publication Data

US 2016/0068314 A1   Mar. 10, 2016

(30) Foreign Application Priority Data

Sep. 8, 2014   (DE) .................. 10 2014 112 889

(51) Int. Cl.
  *B62D 25/24*   (2006.01)
  *B65D 45/16*   (2006.01)
  *B65D 39/00*   (2006.01)

(52) U.S. Cl.
  CPC ............. *B65D 45/16* (2013.01); *B62D 25/24* (2013.01); *B65D 39/0052* (2013.01)

(58) Field of Classification Search
  CPC .... B65D 45/16; B65D 39/0052; F16J 15/061; B62D 25/24
  USPC .................................. 220/784, 359.1–359.4
  See application file for complete search history.

(56) References Cited

U.S. PATENT DOCUMENTS

| 2,497,827 | A | | 2/1950 | Trafton | |
|---|---|---|---|---|---|
| 4,363,420 | A | * | 12/1982 | Andrews | B62D 25/24 220/359.4 |
| 8,162,166 | B2 | * | 4/2012 | Nakazato | B62D 25/24 220/359.4 |
| 2011/0005141 | A1 | * | 1/2011 | Leverger | B62D 25/24 49/463 |
| 2014/0050548 | A1 | | 2/2014 | Loewe et al. | |

FOREIGN PATENT DOCUMENTS

| DE | 202008014641 | 3/2009 |
|---|---|---|
| DE | 102012012485 | 12/2013 |
| DE | 102012016362 | 2/2014 |

* cited by examiner

*Primary Examiner* — James N Smalley
(74) *Attorney, Agent, or Firm* — Joseph M. Butscher; The Small Patent Law Group, LLC

(57) ABSTRACT

On a sealing plug (10) for sealing an opening (12) in a component (14), in particular in a vehicle body part, comprising a base body (16) which can cover the opening (12), a plurality of projecting latch elements (34) which can latch onto the rear wall of the component (14) are provided on the rear face of the base body (16). Further, a plurality of centring elements (40, 48) arranged separately from the latch elements (34) are provided on the rear face of the base body (16) and can lie resiliently flexibly against the edge (54) of the opening (12).

21 Claims, 2 Drawing Sheets

SEALING PLUG

RELATED APPLICATION

This application claims priority from German Patent Application No, 10 2014 112 889.3, filed Sep. 8, 2014, the subject matter of which is incorporated herein by reference.

The invention relates to a sealing plug for sealing an opening in a component, in particular in a vehicle body part, comprising a base body which can cover the opening, a plurality of projecting latch elements which can latch onto the rear wall of the component being provided on the rear face of the base body.

During the production of motor vehicle bodies, it is necessary to seal openings in the components to prevent the penetration of dirt or water. Sealing plugs are used for this purpose, and can be inserted into the opening in the vehicle body part and fixed for example using suitable latch elements which engage in the opening of the component.

However, during the production of vehicle body parts of this type, openings occur which have both different sizes of cross section and different shapes of cross section. However, for reasons of cost, it is desirable to reduce the number of different types of sealing plugs.

SUMMARY OF THE INVENTION

The object of the invention is to provide a sealing plug for sealing an opening which can be used flexibly, making it possible to use one type of sealing plug for openings of different sizes.

To achieve the object, a sealing plug for sealing an opening in a component, in particular in a vehicle body part, is provided, comprising a base body which can cover the opening, a plurality of projecting latch elements which can latch onto the rear wall of the component being provided on the rear face of the base body. According to the invention, a plurality of centring elements arranged separately from the latch elements are provided on the rear face of the base body and can lie resiliency flexibly against the edge of the opening.

The constructional separation of the centring elements from the latch elements has the advantage that it is possible to centre the sealing plug in the opening independently of the latching forces or the latch elements latching onto the rear wall of the components. This ensures that the sealing plug or the base body thereof is positioned centrally on the opening, in such a way that even larger openings can be sealed reliably. The latch elements can also engage more reliably on the rear wall, since they cannot be released by displacement of the base body or sealing plug. The sealing plug according to the invention thus makes more flexible use in different sizes of openings possible, in such a way that the number of different types of sealing plugs which have to be kept in stock can be reduced.

On the base body, webs are for example provided, on which the latch elements and the centring elements are mounted. The webs merely act as a shared holding base for the centring elements and the latch elements. These may perform the functions thereof mutually independently even if they ere held on a shared web.

On each web, for example two spring portions are provided, which extend away from the web in opposite directions. A latch element is provided at the free end of a first spring portion. The second spring portion is part of a centring element and comprises, at the free end, a contact portion which can lie against the edge of the opening. The two spring portions may each extend in the opposite direction in a plane parallel to the plane of the base body, in such a way that the centring elements and the latch elements are arranged in a shared plane and on a periphery. Whilst the latch elements can latch onto the rear wall of the component, the contact portions of the centring elements lie against the edge of the opening and said centring elements centre the sealing plug. Since the latch elements have a wide adjustment range by way of the spring portions, latching is ensured for openings of different sizes.

The spring portions may extend in an arc shape or a spiral shape. The spring portions thus provide a very large spring excursion of the centring elements or contact portions which lie against the edge of the opening and of the latch elements which engage on the rear wall of the component. It is thus possible to adapt the centring elements to openings of different sizes. The shape and spring strength of the spring portions make it possible to adjust the centring force and the centring range in which the centring elements can act or the latching force and the latching range. The spring portions which extend in an arc shape or a spiral shape additionally make it possible for the contact portions of the centring elements always for lie on the edge of the opening.

To provide as large a spring excursion or as large a contact area on the edge as possible, the spring portions preferably extend over an angular range of 60 to 90°. Ideally, the spring portions extend in a plane parallel to the plane of the base body, in such a way that reliable contact on the edge of the opening is provided independently of the position of the contact portions and independently of the compression of the spring portions. For a correspondingly large angular range, it is possible for the latch element provided on a first web to be adjacent in the peripheral direction to the contact portion of a centring element arranged on an adjacent second web, in such a way that centring is also provided by the centring elements in the region of the latch elements in each case.

The webs may each comprise a clearance, in which a second centring element is provided in each case, in such a way that centring of the sealing plug can also be provided in the region of the webs in which no spring portions can act.

The second centring elements each comprise for example a spring flap which extends in the direction of the central axis of the sealing plug. A spring flap of this type has a long spring excursion, providing reliable centring of the sealing plug for openings of different sizes.

To provide improved or simpler sliding of the sealing plug into the opening, insertion ramps are preferably provided on the centring elements and/or on the latch elements. The insertion ramps on the centring elements mean that they can compress better, ensuring that they lie against the edge of the opening.

On the rear face of the base body, a peripheral seal may further be provided, which expands and/or liquefies under the effect of heat. A seal of this type ensures reliable sealing of the opening. Since the sealing plug is always positioned centrally in the opening because of the centring elements, it is ensured that the seal lies against the front face of the component and can thus reliably seal between the base body and the component.

BRIEF DESCRIPTION OF THE DRAWINGS

Further advantages and features may be found in the following description in connection with the accompanying drawings, in which.

DESCRIPTION

Figure 1:
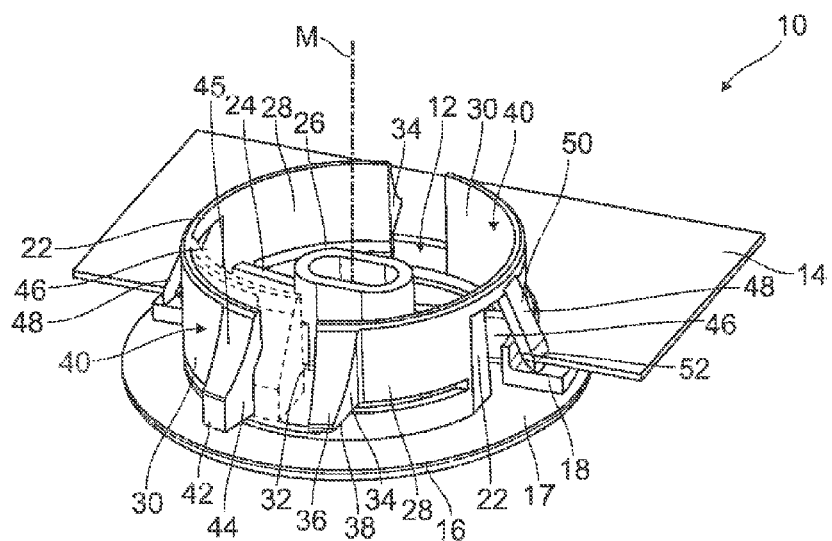
FIG. 1 is a perspective view of a sealing plug according to the invention when mounted in the opening of a component.
Figure 2:
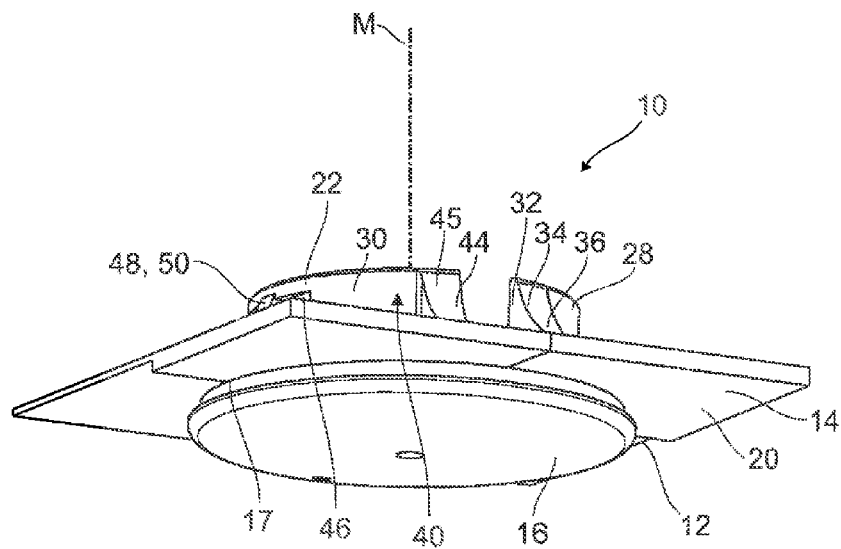
FIG. 2 is a second perspective view of the sealing plug of FIG. 1.

FIGS. 1 and 2 show a sealing plug 10 which seals an opening 12 in a component 14. The component 14 is for example part of a motor vehicle body. The sealing plug 10 seals this vehicle body, preventing penetration of dirt or moisture.

The sealing plug 10 has a base body 16, which in this embodiment is formed substantially circular and planar. On the outer edge of the base body 18, a seal 18 is provided on the rear face 17, and lies against the front face 20 of the component 14 and seals the opening 12 completely against the case body 16.

The seal 18 is for example produced from a material which expands and/or liquefies under the effect of heat. The expansion ensures sealing in the event of defects or gaps in the surface of the component 14. The liquefaction and subsequent hardening of the seal produces a material connection between the base body 16 and the component 14, on the one hand holding the sealing plug 10 reliably in the opening 12, and on the other hand ensuring reliable and durable sealing of the opening 12. In particular, the sealing plug 10 can be heated together with the component 14 after the component 14 is painted.

On the rear face, the base body 16 comprises two webs 22 which extend away from the base body 16 substantially perpendicularly. The webs 22 are connected to a centrally arranged dome 26 via a plurality of web elements 24, in such a way that the webs 22 are held stably in place.

On the webs 22, two spring portions 28, 30 are provided in each case, which extend substantially in an arc shape and concentrically with the central axis M in a plane extending parallel to the plane of the base body 16.

At the free end 32 of the first spring portions 28, a latch element 34 is provided in each case. The latch elements 34 each comprise an introduction ramp 36 extending oblique to the central axis M and a latching face 38 extending parallel to the plane of the base body 16.

The second spring portions 30 are each part of a centring element 40. As well as the spring portions 30, the centring elements 40 each comprise a contact portion 42, which is arranged at the free end 44 of the second spring portion 30, and introduction ramps 45, which are inclined with respect to the central axle M analogously to the introduction ramps 38 of the latch elements 34.

As can be seen in FIGS. 1 and 2, the spring portions each extend over an angular range of approximately 90°, in such a way that there is a contact portion 42 of a centring element 40 directly adjacent to each latch element 34 in the peripheral direction.

The webs 22 further each comprise a clearance 46, in which second centring elements 48 are provided. The second centring elements 48 each comprise a contact face 50 and a spring flap 52 which extends substantially in the direction of the central axis M.

As can be seen in particular in FIG. 2, the contact portion 42 of the latch elements 32 in each case projects beyond the latching face 38 or the latch element 34 in the direction of the central axis M.

Figure 3:
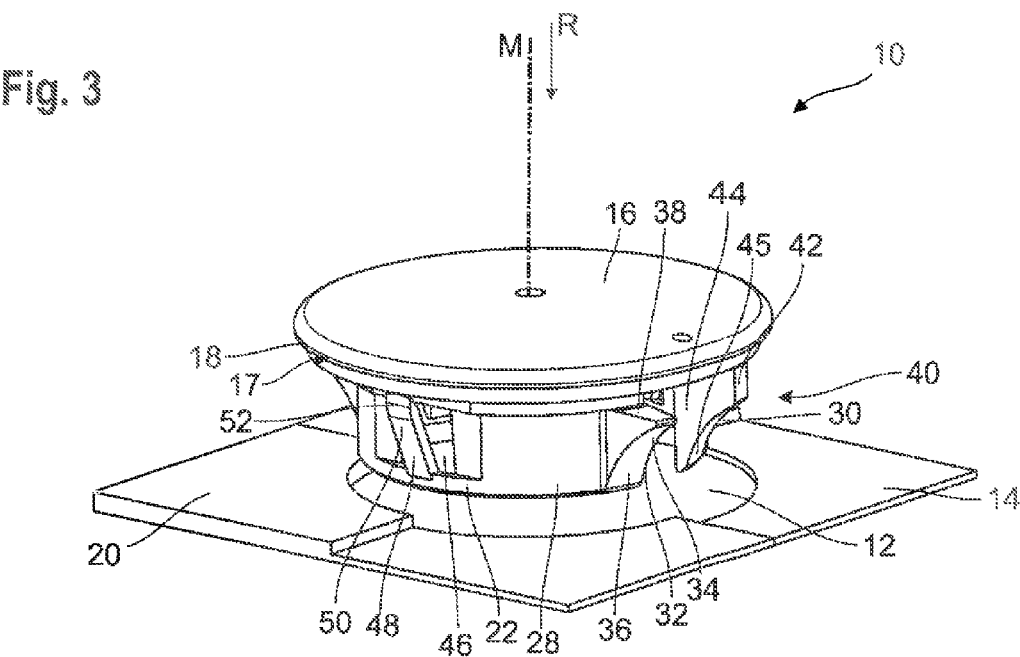
FIG. 3 is a view of the sealing plug of FIG. 1 during mounting in the opening of the component.

The sealing plug 10 is slid into the opening 12 in the component 14 in a mounting direction R extending substantially parallel to the central axis M (FIG. 3).

Figure 4:
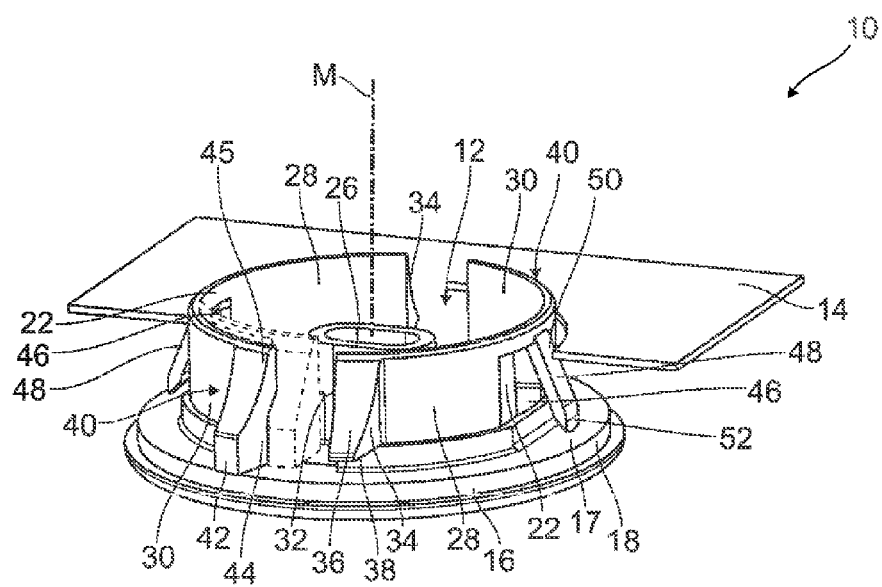
FIG. 4 is a rear view of the sealing plug of FIG. 1 during mounting in the opening of the component.

As can be seen in FIG. 4, when the sealing plug 10 is slid in, the insertion ramps 38, 45 and the spring flap 52 come into contact with the edge 54 of the opening 12. When the sealing plug 10 is slid in further (FIG. 4), the latch elements 34 and the centring elements 40, 48 are urged radially inwards.

When the sealing plug is slid fully into the opening 12, the latch elements 34 are located fully on the rear well of the component 14. The latch element 34 is urged by the spring portions 28 back into the initial position thereof, in which the latching face 38 lies against the rear wall of the component 14 and fixes the sealing plug 10 in the opening 12.

In this position, the contact faces 50 and the contact portions 42 of the centring elements 40, 48 are positioned spring-loaded against the edge 54 of the opening 12 (dashed lines in FIGS. 1 and 4). Since the centring elements 40, 48 are arranged opposite in pairs with respect to the central axis M in each case, the spring force of the second spring portions 30 or the spring flaps 52 centres the sealing plug 10 in the opening 12. This ensures that the base body 16 is placed centrally on the opening 12, in such a way that the seal 18 can reliably seal between the component 14 and the base body 16. In addition, the centring ensures that all of the latch elements can latch reliably onto the rear wall of the component 14, holding the sealing plug 10 securely in the opening 12.

Irrespective of the configuration of the centring elements or latching elements, it is necessary for the centring elements 40, 48 to be arranged on the base body 16 separately from the latch elements 34, in such a way that they can centre the sealing plug 10 or the base body 16 independently of the latch elements 34.

By way of the long spring excursion, the spring portions 28, 30 thus provide very flexible use of the sealing plug 10, since it can be inserted into openings of different sizes. However, depending on the desired purpose of use, other, in particular spring-loaded centring elements and other latch elements may be used.

The arrangement and number of the latch elements 34 and centring elements 40, 48 may be varied as desired. For example, in the embodiment shown in FIG. 1 to 4 it is conceivable for the spring portions 28, 30 each to extend over an angular range of 60°, it then being possible in this embodiment to provide three webs each having a latch element and a centring element.

The invention claimed is:

1. A sealing plug that is configured to seal an opening of a component, the sealing plug comprising:
    a base body that is configured to cover the opening;
    a plurality of projecting latch elements extending from a rear face of the base body, wherein the plurality of projecting latch elements are configured to latch onto a rear wall of the component;
    a plurality of centring elements extending from the rear face of the base body, wherein the plurality of centring elements are structurally different from the plurality of projecting latch elements, and wherein the plurality of centring elements are configured to center the sealing plug within the opening of the component by resiliently abutting against an edge of the opening of the component;
webs extending from the base body, wherein the plurality of projecting latch elements and the plurality of centring elements are coupled to the webs; and
first and second spring portions extending away from each web in opposite directions, wherein a first projecting latch element is provided at a free end of the first spring portion, and wherein a first centring element is provided on the second spring portion.

2. The sealing plug of claim 1, wherein the first and second spring portions extend in an arc shape or a spiral shape.

3. The sealing plug of claim 1, wherein the first and second spring portions extend over an angular range of 60° to 90°.

4. The sealing plug of claim 1, wherein each of the webs comprises a clearance in which a one of the plurality of centring elements is positioned.

5. The sealing plug of claim 4, wherein the one of the plurality of centring elements comprises a spring flap that extends substantially in a direction of a central axis of the sealing plug.

6. The sealing plug of claim 1, wherein each of one or both of the plurality of projecting latch elements or the plurality of centring elements comprises an insertion ramp.

7. The sealing plug of claim 1, further comprising a peripheral seal on the rear face of the base body, wherein the peripheral seal is configured to one or both of expand or liquefy when heated.

8. The sealing plug of claim 1, wherein the plurality of centring elements are configured to center the sealing plug in the opening of the component independently from the plurality of latch elements, and wherein the plurality of latch elements are configured to securely latch the sealing plug to the component independently from the plurality of centring elements.

9. The sealing plug of claim 1, wherein the latch elements are configured to be located fully on the rear wall of the component in a fully secured position, and wherein at least portions of the centring elements are configured to spring-loaded against the edge of the opening in the fully secured position.

10. A system comprising:
a component including front and rear walls, and an opening formed through and between the front and rear walls, wherein the opening is defined by an internal edge of the component; and
a sealing plug that is configured to seal an opening of a component, the sealing plug comprising:
a base body that covers the opening;
a plurality of projecting latch elements extending from a rear face of the base body, wherein the plurality of projecting latch elements latch onto the rear wall of the component in a fully secured position;
a plurality of centring elements extending from the rear face of the base body, wherein the plurality of centring elements are structurally different from the plurality of projecting latch elements, and wherein the plurality of centring elements are configured to center the sealing plug within the opening by resiliently abutting against an edge of the opening of the component in the fully secured position;
webs extending from the base body, wherein the plurality of projecting latch elements and the plurality of centring elements are coupled to the webs; and
first and second spring portions extending away from each web in opposite directions, wherein a first projecting latch element is provided at a free end of the first spring portion, and wherein a first centring element is provided on the second spring portion.

11. The system of claim 10, wherein the first and second spring portions extend in an arc shape or a spiral shape.

12. The system of claim 10, wherein the first and second spring portions extend over an angular range of 60° to 90°.

13. The system of claim 10, wherein each of the webs comprises a clearance in which a one of the plurality of centring elements is positioned, wherein the one of the plurality of centring elements comprises a spring flap that extends substantially in a direction of a central axis of the sealing plug.

14. The system of claim 10, wherein each of one or both of the plurality of projecting latch elements or the plurality of centring elements comprises an insertion ramp.

15. The system of claim 10, wherein the plurality of centring elements center the sealing plug in the opening of the component independently from the plurality of latch elements, and wherein the plurality of latch elements securely latch the sealing plug to the component independently from the plurality of centring elements.

16. The system of claim 10, wherein the latch elements are located fully on the rear wall of the component in a fully secured position, and wherein at least portions of the centring elements are spring-loaded against the edge of the opening in the fully secured position.

17. The sealing plug of claim 1, wherein the plurality of centring elements differ in shape and size from the plurality of projecting latch elements.

18. The system of claim 10, wherein the plurality of centring elements differ in shape and size from the plurality of projecting latch elements.

19. A sealing plug that is configured to seal an opening of a component, the sealing plug comprising:
a base body that is configured to cover the opening;
a plurality of projecting latch elements extending from a rear face of the base body, wherein the plurality of projecting latch elements are configured to latch onto a rear wall of the component;
a plurality of centring elements extending from the rear face of the base body, wherein the plurality of centring elements are structurally different from the plurality of projecting latch elements, and wherein the plurality of centring elements are configured to center the sealing plug within the opening of the component by resiliently abutting against an edge of the opening of the component; and
webs extending from the base body, wherein the plurality of projecting latch elements and the plurality of centring elements are coupled to the webs, wherein each of the webs comprises a clearance in which a one of the plurality of centring elements is positioned.

20. The sealing plug of claim 19, wherein the one of the plurality of centring elements comprises a spring flap that extends substantially in a direction of a central axis of the sealing plug.

21. A system comprising:
a component including front and rear walls, and an opening formed through and between the front and rear walls, wherein the opening is defined by an internal edge of the component; and
a sealing plug that is configured to seal an opening of a component, the sealing plug comprising:
a base body that covers the opening;

a plurality of projecting latch elements extending from a rear face of the base body, wherein the plurality of projecting latch elements latch onto the rear wall of the component in a fully secured position;

a plurality of centring elements extending from the rear face of the base body, wherein the plurality of centring elements are structurally different from the plurality of projecting latch elements, and wherein the plurality of centring elements are configured to center the sealing plug within the opening by resiliently abutting against an edge of the opening of the component in the fully secured position; and webs extending from the base body, wherein the plurality of projecting latch elements and the plurality of centring elements are coupled to the webs, wherein each of the webs comprises a clearance in which a one of the plurality of centring elements is positioned, wherein the one of the plurality of centring elements comprises a spring flap that extends substantially in a direction of a central axis of the sealing plug.

\* \* \* \* \*